June 27, 1961 P. E. YOST 2,990,147
BALLOON LOAD ATTACHMENT FITTING
Filed March 21, 1956
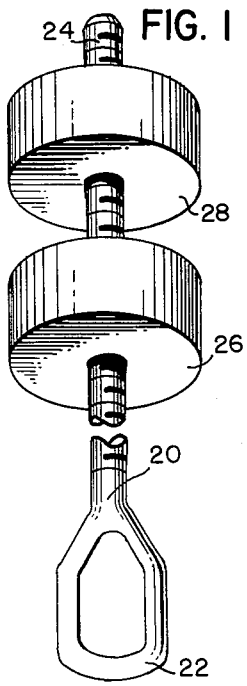
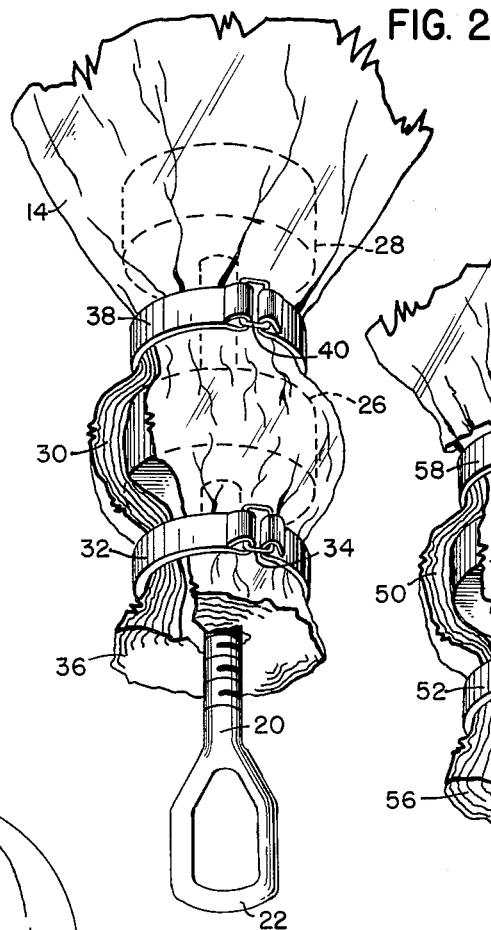
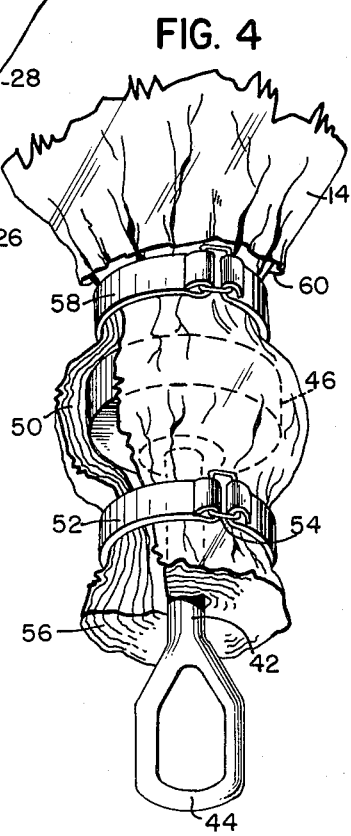
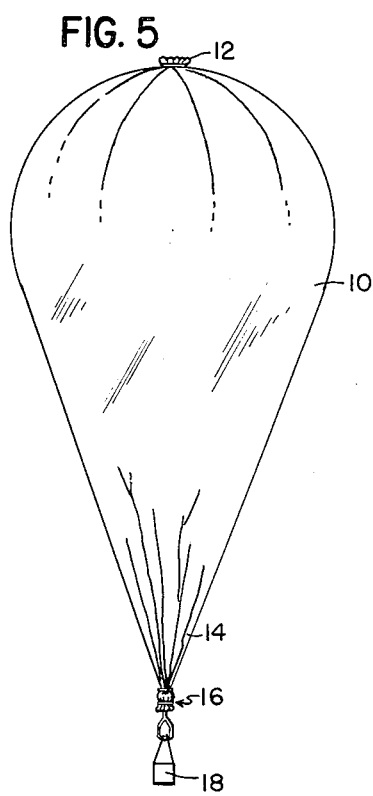
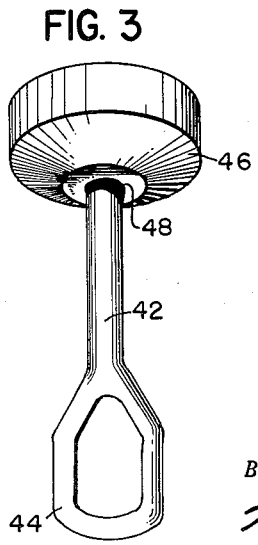
INVENTOR.
PAUL E. YOST
BY
*William C. Babcock*
ATTORNEY

United States Patent Office 2,990,147
Patented June 27, 1961

2,990,147
BALLOON LOAD ATTACHMENT FITTING
Paul E. Yost, Hugo, Minn., assignor to General
Mills, Inc., a corporation of Delaware
Filed Mar. 21, 1956, Ser. No. 572,899
9 Claims. (Cl. 244—127)

The present invention relates to balloons and more particularly to an improved attachment fitting for securing the payload to a high altitude balloon.

Various attachment fittings are known for use with balloons of thermoplastic material. Some of these fittings require special time and effort for installation and careful and expensive machining of parts. It is an object of the present invention to provide a balloon load attachment fitting of simple and economical construction.

It is a further object to provide a fitting which can be readily installed in the field.

Still another object is a balloon fitting in which adjustment of the balloon volume is facilitated.

Other objects and advantages will be apparent from the following specification in which certain preferred embodiments of the invention are described with particular reference to the accompanying drawings. In these drawings:

FIGURE 1 is a perspective view of a portion of a preferred form of load attachment fitting according to the invention;

FIG. 2 is a perspective view of the device of FIG. 1 completely assembled with the lower end of a balloon envelope.

FIG. 3 is a view similar to FIG. 1 of a further embodiment of the invention;

FIG. 4 is a view similar to FIG. 2 of a balloon completely assembled with the device of FIG. 3; and FIG. 5 is a side view of a completely assembled balloon and load, in which a load attaching feature according to the present invention is used.

As shown in FIG. 5 the fitting of the present invention is adapted for use with high altitude balloons of various types. One such type is shown at 10 and includes a balloon body portion of light plastic material designed to contain the desired volume of lifting gas to support a suitable payload. The balloon body 10 may be made in various ways, but customarily includes a tubular body portion with open ends which are closed and sealed in some manner. Thus the upper end of the balloon body is sealed and secured at 12, while the lower end 14 is adapted for assembly with the fitting of the present invention. The assembled fitting, shown generally at 16, provides means for closing the lower end of the balloon envelope to the extent desired, as well as means for attachment of a desired payload 18.

The fitting is partially shown in FIG. 1 and includes a load shaft 20 having means 22 at one end for attachment of the payload. In this case the means 22 consists of an integral eye or loop at the lower end of the vertical load shaft 20.

The upper end 24 of load shaft 20 is provided with means for attachment of one or more clamping plates 26 and 28. In the embodiment of FIGS. 1 and 2, two such clamping plates are utilized. They are secured in operative position on the load shaft 20 by means of threads on the end 24 of the shaft and cooperating threads on the central bore of each of the clamping plates 26 and 28. These threads not only provide means for mounting the clamping plates on the shaft 20, but also provide means for adjustment of the relative position and spacing of the plates along the shaft.

The clamping plates themselves are adapted for insertion within the lower end of the balloon envelope as shown in FIG. 2. The cross section of these clamping plates or members is substantially greater than the diameter or cross section of shaft 20. Preferably the clamping plates are circular and are mounted concentrically on the shaft 20 as shown in FIG. 1.

When the fitting is to be assembled with a balloon body the lower end of the balloon body is gathered in folds or pleats around the outside of the clamping plates and load shaft as illustrated in FIG. 2. Thus the folds or pleats of the balloon body extend over and around the lower clamping plate as shown at 30. To retain the attachment fitting and balloon material layers in assembled position, a pair of clamping members are utilized. Thus an outer clamping member 32 is adapted to pass around the outside of the gathered balloon material just below the outer or lower clamping plate 26. The clamping band 32 includes securing means 34 which locks the band tightly around the balloon material at this point. The diameter of clamping band 32 is substantially less than the outer diameter of the section of material which passes around the circumference of clamping plate 26 at 30. Preferably the band 32 should tighten the material in firm and close engagement around the load shaft 20.

The natural fullness of the balloon material will then cause it to flare outwardly at its lowermost end as shown at 36, to assist in preventing the clamp 32 from slipping downwardly off the material.

The fitting of the present invention also includes an upper or inner clamping means in the form of a band or ring 38 secured around the outside of the balloon material between the clamping plates 26 and 28. A suitable locking means 40 holds the band 38 in assembled position around the material in known manner. For example, the ends of band 38 may be inserted in locking ring 40 and crimped back as shown, on assembly of the device to the balloon. The band 38 is essentially similar to the band or clamping means 32 and is thus adapted to clamp the gathered balloon material firmly against the load shaft 20 between the clamping plates. Thus the material is effectively bent around the lower clamping plate 26 in a curved or tortuous path which insures firm engagement of the parts and prevents relative slipping movement between the attachment fitting and the balloon envelope. The upper clamping plate 28, which is inside the balloon, insures the outward flaring of the balloon material above the upper clamping band 38. This location of the upper clamping plate 28 also prevents the upper or inner band 38 from sliding upwardly along the balloon material. The band 38 is thus maintained in the desired location closely adjacent plate 26 to hold the balloon material firmly in engagement with said plate. The construction shown in FIGS. 1 and 2 thus provides an attachment fitting which can be readily assembled with the gathered material at the lower open end of a balloon envelope to close the envelope at this point and to provide means for attachment of the desired payload. The device is readily assembled with the balloon. The device may also be readily adjusted to vary the volume within the balloon envelope above the fitting. The relative adjustment of the plates also provides for change in the relative spacing between these parts to insure firm clamping engagement with balloons of different sizes which may thus have different relative thicknesses of gathered material at their lower end. In appropriate cases, the clamping plates 26 and 28 may be readily removed, by virtue of their threaded connection, and replaced by clamping plates of different relative diameter or cross section.

In certain cases, depending on the relative thickness of the gathered balloon material and the expected load, the simplified embodiment of FIGS. 3 and 4 may be used. As shown in FIG. 3, this embodiment includes a load shaft 42 with an integral load attachment means or ring 44 at its lower end. A single clamping plate 46 is mounted on the shaft 42 at 48. While an adjustable or threaded connection could be used at this point, the present embodiment shows the plate 46 firmly secured at 48 without means for adjustment. When this portion of the fitting is assembled as in FIG. 4 within the lower end of a balloon envelope 14, the gathered balloon material extends around the plate 46 as shown at 50. An outer or lower clamping band 52 has its end secured together at 54 and is located just below the clamping plate 46. Thus the material is held tightly against the load shaft 42. The free end of the material may flare outwardly at 56 as in the previous case.

An upper clamping member or band 58 has its ends secured together at 60 and is adapted to engage the outer periphery of the balloon material just above the clamping plate 46. In this case the inflation or partial inflation of the balloon body 14 above the clamp will assist in preventing sliding movement of the clamp upwardy along the balloon material away from the plate 46. The relative diameter of the clamping rings 52 and 58 effectively bends the balloon material in a tortuous path around the clamping plate 46 to seal the lower end of the balloon and prevent disengagement of the fitting from the balloon under expected load conditions.

While the relative diameter of the clamping rings with respect to the clamping plate may vary depending on the expected quantity and relative thickness of the gathered material at the lower end of the balloon, the diameter of the clamping rings is preferably less than the outer diameter of the clamping plates.

In order to avoid abrasion or tearing of the balloon material, a suitable protective cover 60 is preferably located between the balloon material and the inner surfaces of the clamping rings. For convenience, a single sheet of protective material 60 may extend from a point just above the upper clamping ring to a point below the lower clamping ring and coextensive with the lower edge of the balloon material. The protective sheet may be of plastic material and in appropriate cases should have a greater thickness than the relatively thin material of the balloon envelope in order to assure adequate protection of the latter.

As one example of a fitting adapted for use according to the present invention, a device like that shown in FIG. 1 was constructed having the body dimensions:

|  | Inches |
|---|---|
| Diameter of load shaft 20 | .625 |
| Outer diameter of clamping plates 26, 28 | 3.0 |
| Inner diameter of clamping bands 32 and 38 (approx.) | 1.375 |
| Axial spacing between plates 26 and 28 | 2.0 |

The above fitting was assembled with a balloon of substantially 19,500 cubic feet capacity, having a balloon body of polyethylene material with a thickness of two mils. The opening in the lower end of the balloon body had a circumference of 425 inches. The material at this lower end of the balloon was carefully gathered and evenly folded or pleated around the load shaft 20 and plates 26 and 28 as shown in FIG. 2. A balloon with load attachment fitting assembled in the above fashion can be used satisfactorily for flights involving payloads of substantially 3,000 pounds.

According to the foregoing specification, a balloon assembly and balloon load attachment fitting have been described which substantially accomplish the objectives set forth at the beginning of this application. Since minor variations and changes in the exact details of the apparatus features will be apparent to persons skilled in this field, it is intended that this invention shall cover all such changes and modifications as fall within the spirit and scope of the attached claims.

Now, therefore, I claim:

1. A balloon load attachment fitting comprising a load shaft having load attachment means at one end and having its other end adapted for insertion within a balloon envelope, said balloon envelope being gathered at its lower end, a clamping plate of substantially larger cross section than the shaft mounted on the shaft and adapted to fit inside the gathered end of the balloon, and inner and outer clamping means adapted to fit around the outside of the balloon material immediately above and below said clamping plate, the diameter of each of said inner and outer clamping means being substantially less than the outer diameter of the gathered envelope at a point where the envelope extends around the clamping plate and thereby adapted to bend the material in a tortuous path around the clamping plate to seal the balloon end and prevent disengagement of the fitting.

2. A balloon load attachment fitting according to claim 1 having a protective sheet of plastic material adapted to cover the gathered envelope and be located between said balloon material and said clamping means.

3. A balloon assembly having a balloon body of thin plastic material with an open gathered lower end, and a balloon load attachment fitting closing said lower end, the attachment fitting comprising a vertical load shaft, load attachment means at the lower end of said shaft, the upper end of said shaft being adapted for insertion within the lower end of the balloon, a circular clamping plate concentrically mounted on said shaft, said clamping plate having a larger cross section than the shaft and fitting inside the gathered lower balloon end, and first and second clamping bands secured around the outside of the balloon material immediately above and below said plate, the diameter of each of said first and second bands being substantially less than the outer diameter of the gathered end at a point where the envelope surrounds said clamping plate and thereby bending the material in a tortuous path around the clamping plate to seal the balloon end and prevent disengagement of the fitting.

4. A balloon assembly, having a balloon body of thin plastic material with an open gathered lower end, and a balloon load attachment fitting closing said lower end, the attachment fitting comprising a vertical load shaft, load attachment means at the lower end of said shaft, the upper end of said shaft being adapted for insertion within the lower end of the balloon, a circular clamping plate concentrically mounted on said shaft, said clamping plate having a larger cross section than the shaft and fitting inside the gathered lower balloon end, and first and second clamping bands secured around the outside of the balloon material immediately above and below said plate, the diameter of said bands being substantially less than the outer diameter of the gathered end at a point where the envelope surrounds said clamping plate, said balloon assembly including a second clamping plate mounted on said load shaft and spaced inwardly of the balloon above the first clamping plate and upper clamping band.

5. A balloon assembly according to claim 4 including means for adjusting the relative spacing between said plates along said shaft, said adjusting means including a threaded portion on said shaft and cooperating threads on at least one of said plates.

6. A balloon load attaching fitting comprising a load shaft having load attachment means at one end, a clamping plate having a larger cross section than said shaft and adapted to fit inside the lower end of a balloon body, means for mounting said plate at the other end of said shaft including a threaded portion on said shaft and a threaded opening in the plate, and first and second clamping bands adapted to fit around the outside of the balloon body immediately above and below said plate, the diameter of each of said first and second clamping bands being substantially less than the expected outer diameter of the balloon body when the body is gathered around said plate and thereby adapted to bend the material in a tortuous path around the clamping plate to seal the balloon end and prevent disengagement of the fitting.

7. A balloon load attachment fitting comprising a load shaft having load attachment means at one end, a clamping plate of larger cross section than the shaft adapted to fit inside an open end of a balloon body, means mounting said clamping plate on the other end of said shaft, and first and second clamping rings adapted to fit concentrically around the outside of said balloon body end immediately above and below said plate, the inner diameter of each of said first and second clamping rings being smaller than the outer diameter of said plate and thereby adapted to bend the material in a tortuous path around the clamping plate to seal the balloon end and prevent disengagement of the fitting.

8. A balloon load attachment fitting comprising a load shaft having load attachment means at one end, a clamping plate of larger cross section than the shaft adapted to fit inside an open end of a balloon body, means mounting said clamping plate on the other end of said shaft, and first and second clamping rings adapted to fit concentrically around the outside of said balloon body end immediately above and below said plate, the inner diameter of said clamping rings being smaller than the outer diameter of said plate, and said fitting also having a second clamping plate mounted on said load shaft and spaced along said shaft in a direction inwardly of the balloon body from the first plate, and means for adjusting the relative spacing of said plates including a threaded portion on said shaft and cooperating threads on at least one of said plates.

9. A balloon fitting according to claim 8 having a protective cover of plastic sheet material substantially thicker than the balloon body material, said protective sheet extending around said clamping plate and associated balloon material and inside said clamping rings between the latter and the balloon material.

References Cited in the file of this patent

UNITED STATES PATENTS

| | | |
|---|---|---|
| 44,907 | Wood | Nov. 1, 1864 |
| 600,967 | Mead | Mar. 22, 1898 |
| 684,447 | Mitzel | Oct. 15, 1901 |
| 1,300,640 | Pasternak | Apr. 15, 1919 |
| 1,466,734 | Schweinert | Sept. 4, 1923 |
| 1,798,094 | Malvein et al. | Mar. 24, 1931 |
| 2,759,694 | Bohl et al. | Aug. 21, 1956 |
| 2,779,554 | Kizzek | Jan. 29, 1957 |
| 2,880,946 | Froehlich | Apr. 7, 1959 |

FOREIGN PATENTS

| | | |
|---|---|---|
| 21,782 | Great Britain | Sept. 26, 1910 |
| 430,748 | France | Sept. 29, 1911 |